Sept. 8, 1959   J. M. DAVIS ET AL   2,903,569
METHOD OF FORMING SPIRAL BLADES
Filed May 18, 1956   2 Sheets-Sheet 1
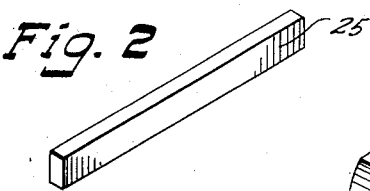
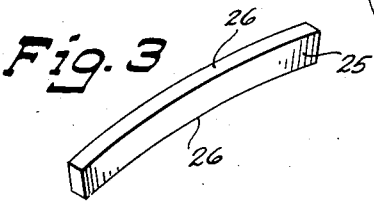
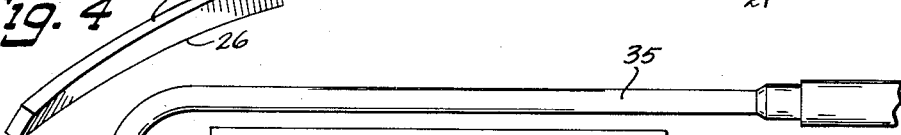
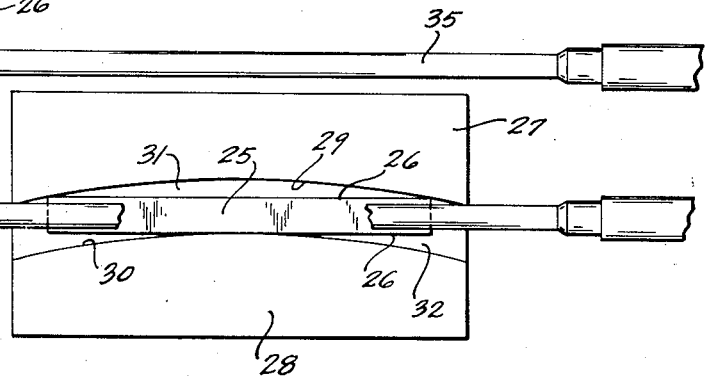
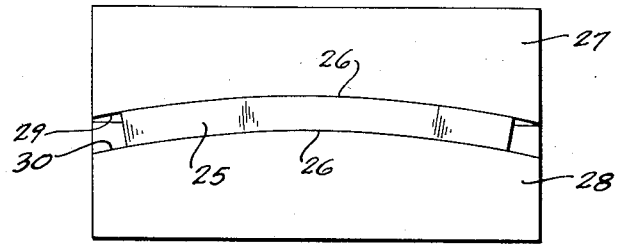
INVENTORS
Jacob M. Davis,
BY Gordon H. Hochmuth
Elroy J. Wutschel
Attorney Sept. 8, 1959    J. M. DAVIS ET AL    2,903,569
METHOD OF FORMING SPIRAL BLADES
Filed May 18, 1956    2 Sheets-Sheet 2
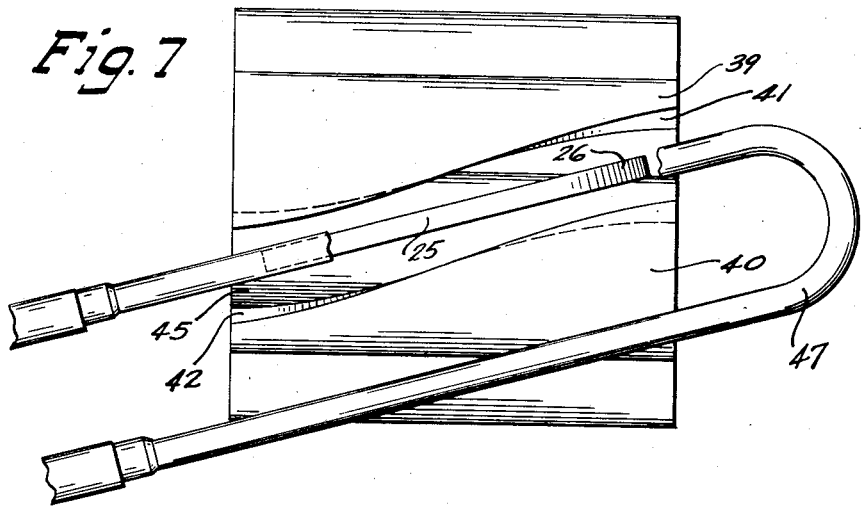
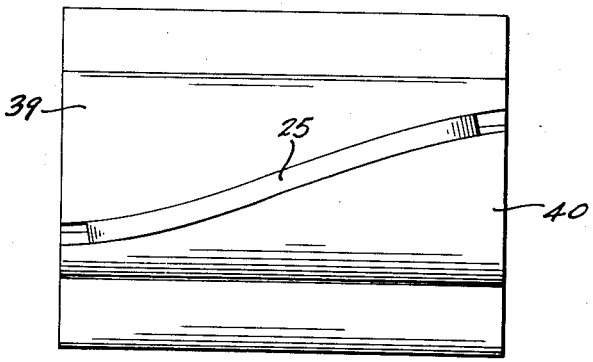
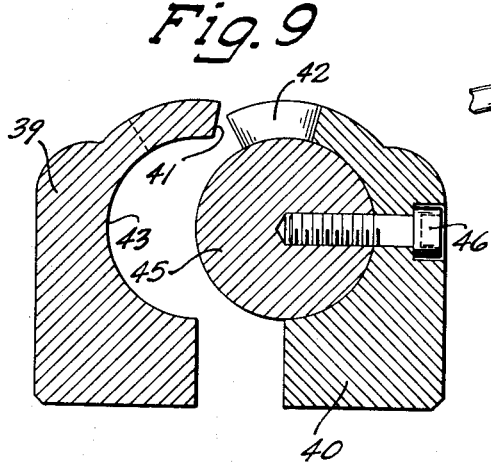
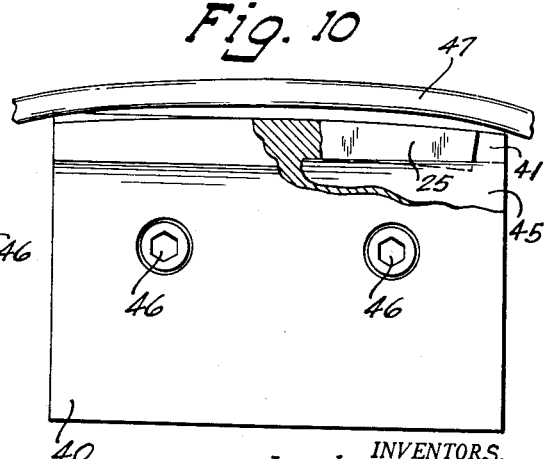
INVENTORS.
Jacob M. Davis,
Gordon H. Hochmuth
BY
Elmer J. Wertschel
Attorney United States Patent Office 2,903,569
Patented Sept. 8, 1959

2,903,569

METHOD OF FORMING SPIRAL BLADES

Jacob M. Davis, Milwaukee, and Gordon H. Hochmuth, West Allis, Wis., assignors to Kearney & Trecker Corporation, West Allis, Wis., a corporation of Wisconsin Application May 18, 1956, Serial No. 585,829

10 Claims. (Cl. 219—153)

This invention relates generally to a method of shaping blanks to form complex curvatures, and more particularly to an improved method of shaping blanks which is especially adapted for forming spiral sintered carbide cutter blades for attachment to a cutter body.

Sintered carbide is an extremely hard and very strong material that is recognized as an ideal cutting material for metal cutting tools which enables many material removing operations to be performed much more efficiently. The physical properties of sintered carbide which render it particularly well adapted for cutting metals and other materials also cause it to be difficult to work into complex configurations. For this reason it was originally impractical to produce a curved carbide cutter surface and the use of sintered carbide for cutting tools has been confined to tools that present a flat cutting surface, such as face mills, lathe tool bits and other similar structures. In these applications it has been the practice to braze a relatively small piece of sintered carbide material to a cutter tooth or body or to provide a straight elongated carbide blade at an angle to the axis of the cutter body to form the cutting surface. More recently new methods of forming spiral carbide cutter blades have been developed and such blades are now available for attachment to cutting tools which require a curved cutting surface, such as end mills, shell mills, reamers and the like. However, the spiral carbide cutter blades presently available are not entirely satisfactory inasmuch as they are considerably more expensive than a straight carbide cutter blade of comparable size and they are not uniformly accurate. A limited amount of inaccuracy in the blade can be tolerated but it further increases the cost of the cutting tool because, as the inaccuracy of the blade increases, the amount of grinding required after the blades have been secured to the tool body likewise increases in order to produce the proper cutting surfaces. Furthermore, as the inaccuracy of the blade increases, the rigidity of its mounting decreases by reason of its lack of proper engagement with the supporting surface of the cutter body.

It is therefore a general object of the present invention to provide an improved method of shaping blanks into curved blades.

Another object of the present invention is to provide an improved method of producing spiral carbide cutter blades.

Another object is to provide a method of forming spiral carbide cutter blades of superior and uniform accuracy without producing scale on the surface of the blade.

Another object is to provide a method of forming spiral carbide cutter blades that will produce blades requiring a minimum amount of grinding to produce the proper cutting surface after the blades have been secured to a tool body.

Another object is to provide an inexpensive procedure for producing spiral carbide cutter blades of uniform and superior accuracy.

Spiral cutter blades for attachment to a cutting tool body require two distinct curvatures, one of which is the edgewise camber of the blade to accommodate the diameter of the shank of the tool body against which the interior edge of the blade rests, and the other is the spiral configuration of the blade to establish the desired curvature of the cutting surface. According to the present invention these two curvatures are formed successively in two separate sets of dies rather than simultaneously in a single set of dies to improve the degree of accuracy attainable in the completed blade. The process is initiated with a straight flat blank of the required size which is placed between the faces of a set of dies shaped to form the camber of the blade. An electric current is induced into the blank while it is disposed between the dies for the purpose of elevating its temperature sufficiently to render it plastic. Immediately upon attaining this condition the dies are actuated to form the camber of the blade in the heated blank and the flow of electric current in the blank is terminated. The blank is then cooled and placed between the faces of a set of dies shaped to form the spiral curvature of the blade. An electric current is again induced into the blank as it sets in the spiral dies, and as soon as its temperature is elevated sufficiently to render it plastic, the spiral dies are actuated to form the spiral curvature in the blank and the flow of induced current in the blank is terminated. This completes the formation of the blade and it is cooled and removed from the dies. The dies are fabricated of a non-ferrous material that has a good resistance to deterioration at high temperatures and possesses good heat and electrical conductance properties so that they are not very sensitive to the induced electrical current and their temperature will therefore remain relatively low in comparison to the temperature of the heated blank. The flow of induced current into the blank is terminated at approximately the same time that the dies are actuated, so that the intimate contact with the cooler surfaces of the dies will serve as a quench to rapidly reduce the temperature of the blank without cracking it by excessively drastic temperature changes. It is apparent therefore that the blank is maintained at the maximum temperature in a plastic state for a minimum period of time to avoid excessive oxidation of its surfaces and prevent the formation of scale.

The foregoing and other objects of this invention which will become more fully apparent from the following detailed description may be achieved by the particular embodiment depicted in and described in connection with the accompanying drawings, in which:

Figure 1 is a perspective view of an end mill incorporating inserted spiral cutter blades which may be formed by employing the method taught in the present invention;

Fig. 2 is a perspective view of a straight, flat blank which may be formed into a spiral cutter blade in accordance with the teachings of the present invention;

Fig. 3 is a perspective view of the blank shown in Fig. 2 after it has been shaped to include the camber of the blade;

Fig. 4 is a perspective view of the blank shown in Fig. 3 with the spiral curvature of the blade added to form the completed blade;

Fig. 5 is a plan view of the blank shown in Fig. 2 disposed between the open faces of the two dies shaped to form the camber of the blade in the blank with an induction coil in position directly above the blank;

Fig. 6 is a plan view of the blank and dies shown in Fig. 5 with the induction coil removed, and the faces of the dies closed on the blank to form the camber in the blank as shown in Fig. 3;

Fig. 7 is a plan view of a cambered blank as shown in

Fig. 3 disposed between the open faces of the two dies shaped to form the spiral curvature of the blade as shown in Fig. 4 with an induction coil in position directly above the blank;

Fig. 8 is a plan view of the blank and dies shown in Fig. 7 with the induction coil removed, and the faces of the dies closed on the blank to form the spiral curvature in the blank and thereby complete the formation of the blade shown in Fig. 4;

Fig. 9 is a view in vertical section through the pair of dies shown in Fig. 7 with the faces of the dies being in their open position for receiving a blank to be formed; and, Fig. 10 is a view in side elevation of the spiral forming dies shown in Fig. 8 with the blank in position between the faces of the dies and the induction coil in position over the length of the blank for heating it prior to the forming operation.

Reference is now made more particularly to the drawings and specifically to Fig. 1 thereof illustrating a cutting tool 15 incorporating inserted sintered carbide cutter blades that may be formed into the depicted configuration by the method of the present invention. The cutting tool 15 shown in Fig. 1 is an end mill for the purpose of depicting an illustrative embodiment, but it is to be understood that other types of cutting tools, as for example, shell mills, slab mills, reamers, and the like, employ curved cutting surfaces, and these blades may likewise be formed by the method of the present invention.

The cutting tool 15 comprises a body 16 having a shank portion 17 which is adapted to receive a plurality of inserted carbide cutting blades 18. It will be observed from the view in Fig. 1 that the shank 17 is shaped to form flutes 19 which serve to guide the movement of the chips removed from the workpiece by the cutter blades 18. Each of the flutes 19 blends with a further curvature of the surface of the shank 17 to form a backing 21 which serves to support the blades 18 in position on the shank 17. Because of these complex configurations of the surface of the shank 17, the latter does not have a uniform diameter, but for the purposes of this description, that portion of the shank 17 against which the inner edges of the blades 18 rest will be referred to as the shank diameter and is identified by the reference numeral 20.

The blades 18 require two separate curvatures to adapt them for insertion on the cutting tool 15. One of these curvatures is called the camber, and the other is the spiral curvature of the blade. The cutting blade 18 is not parallel to the axis of the shank 17, but rather is disposed at a helical angle thereto. Therefore it is necessary that its edges be curved longitudinally to form arcuate edges which accommodate the shank diameter, and this arcuate configuration of the lengths of the blade edges is termed the camber of the blade 18. The longitudinal twist to provide the desired configuration of the cutting surface is termed the spiral curvature.

The present invention provides for the formation of the cutting blade 18 from a straight flat blank 25 illustrated in Fig. 2. The two curvatures of the blade are formed successively rather than simultaneously to simplify the operation and assure the accuracy of the completed blade. The camber of the cutting blade 18 is formed first, and to this end, the blank 25 is curved edgewise along its length to form arcuate edges 26 as illustrated in Fig. 3, to establish the camber of the blade for accommodating the shank diameter 20. After the parallel edges 26 have been curved to provide the camber of the blade, the cambered blank 25 is twisted along its length to form the spiral curvature which completes the formation of the blade 18 as clearly shown in Fig. 4. Both of these forming operations are performed in suitable dies in a manner to be presently described.

The camber of the cutting blade 18 is formed in a pair of complementary camber dies 27 and 28 shaped in accordance with the desired arcuate configuration of the edges 26. The camber die 27 is provided with an arcuate face 29 which conforms to the desired curvature of the exterior edge 26, while the complementary die 28 is provided with a corresponding arcuate face 30 shaped to produce the desired curvature in the interior edge 26 of the blade 18. The blank 25 is placed between the open faces 29 and 30 of the dies 27 and 28, resting on flats 31 and 32 which are provided below the faces 29 and 30 respectively.

After the blank 25 is thus disposed between the faces 29 and 30 of the camber dies 27 and 28, an induction coil 33 is placed so that a portion of it is disposed directly above the blank 25 along the entire length of the blank between the dies 27 and 28 as illustrated in Fig. 5. The induction coil 35 is then energized with a high frequency electric current in a manner well known in the art to induce a flow of electric current into the blank 25 for the purpose of elevating its temperature sufficiently to render it plastic. Because of the relatively small cross sectional area of the blank 25, the induced current will elevate its temperature rapidly to approximately 2600° F. When this approximate temperature is reached, the camber dies 27 and 28 are actuated to close their faces against the edges of the blank 25, for shaping the blank to establish the camber of the blade 18.

By observing the color of the blank 25 as it is influenced by the induced current, it may be readily determined when its temperature has been elevated sufficiently to render it plastic, since this condition is reached when the blank becomes white hot. As soon as a white heat is observed, the dies 27 and 28 are actuated to close their faces against the blank 25 for forming the camber in its edges 26. The flow of induced current in the blank 25 may be terminated immediately after the dies 27 and 28 have been actuated into their closed position, but it has been found preferable to terminate this flow of current in the blank 25 at the moment that the movement of the dies to their closed position is initiated so that the blank 25 is maintained at the elevated temperature a very minimum amount of time. By thus reducing to a minimum the time that the blank 25 is at its maximum temperature, the possibility of producing scale on its surface due to excessive oxidation is likewise reduced to a minimum.

After terminating the flow of induced current in the blank 25, it is permitted to cool sufficiently in the closed dies 27 and 28 to render it rigid. The rigid cambered blank 25 is then inserted between the open faces of a pair of dies 39 and 40 which are shaped to form the spiral curvature of the cutter blade 18. The dies 39 and 40 are provided with complementary faces 41 and 42 which are shaped to twist the cambered blade 25 into the desired spiral curvature to complete the formation of the cutting blade 18.

It will be noted from the view in Fig. 9 that the die 39 is provided with a semicylindrical opening 43 extending along its length directly beneath the spiral face 41, while the die 40 has an identical opening directly opposite of the opening 43 and beneath the spiral face 42. However, the semicylindrical opening in the die 40 is occupied by a cylindrical insert 45 which is secured in position by suitable screws 46. The diameter of the insert 45 conforms to the shank diameter 20 of the cutter 15 to which the cutter blade 18 is to be applied so that when the blank 25 with the camber formed therein is placed between the faces 41 and 42 of the dies 39 and 40 respectively, the blank 25 will be resting on the insert 45, in the same manner as it will be positioned on the shank of the cutter. As the faces 41 and 42 of the dies 39 and 40 are closed, the insert 45 will move into the clearance provided by the opening 43 in the die 39.

After the blank 25 is positioned on the insert 45 between the faces 41 and 42, an induction coil 47 is placed above the dies 39 and 40 as shown in Fig. 7 so that a portion of it is located directly above the top edge of the blank 25 along the entire length of the blank without contacting it. It will be noted from the view in Fig. 10 that the portion of the induction coil 47 adjacent to the blank 25 is curved to accommodate the camber of the blade. In order to obtain uniform heating of the blank 25 it has been found to be preferable to establish a somewhat sharper curvature for the induction coil 47 at the points adjacent to the ends of the blank 25 so that the induction coil 47 is closer to the ends of the blank 25 than it is to the rest of the blank. This arrangement serves to create more heat at the ends of the blank which compensates for the tendency of the ends to dissipate more heat by reason of the greater area that is exposed to air. The net result is that the entire length of the blank is brought to a uniform temperature by the operation of the induction coil 47.

After the induction coil 47 is thus positioned in relation to the blank 25, it is energized from a suitable source of high frequency electric current for the purpose of inducing a flow of electric current in the blank 25 to rapidly elevate its temperature and thereby render it plastic. As soon as a white heat is observed in the blank 25, the dies 39 and 40 are actuated to close their faces 41 and 42 against the sides of the blank 25 as shown in Fig. 8 to form the spiral curvature of the cutting blade 18. The flow of the induced current in the blank 25 may be terminated immediately after the curvature of the blade has been formed therein, although again it has been found to be preferable to terminate this flow at the same moment that the dies are being initiated in their movement to form the spiral curvature so that the blank 25 is maintained at its elevated temperature a very minimum amount of time. The blade is then allowed to cool until it becomes rigid before removing it from the dies 39 and 40. This step completes the formation of the cutter blade 18 and it is ready to be attached by brazing or other suitable means to the shank 17 of the cutter 15.

It is essential that the pair of camber forming dies 27 and 28 as well as the pair of spiral forming dies 39 and 40 be fabricated of a nonferrous material that is a good conductor of both heat and electricity. An ideal material for this purpose has been found to be copper as it is an excellent conductor of both heat and electricity and is not adversely affected by the high heat to which it is subjected.

It is important that the dies 27 and 28, and the dies 39 and 40 be fabricated of a material that is a good conductor of both heat and electricity for the proper functioning of the described process. Good electrical conductivity is required to prevent the dies from being heated excessively by the action of the induction coils 35 and 47. The sintered carbide cutter blade 25 offers a relatively high resistance to the flow of electrical current therein and is therefore heated rapidly to the desired temperature in a matter of moments. By employing a superior electrical conductor for the dies which form the cutter blade 18, the electricity induced therein by the induction coils 35 and 47 will flow through the material without encountering as much resistance so that the temperature of the die faces will not approach the maximum temperature of the blank 25. On the other hand, some heating of the surfaces of the faces of the dies does occur by reason of the induced current from the coils 35 and 47, and by radiation from the heated blank 25, but this temperature is substantially below the maximum temperature of the blank 25. Such slight heating of the die faces is desirable in order to avoid an excessively drastic reduction in the temperature of the blank 25 as it is contacted by the die faces since an excessively rapid change in temperature might possibly cause it to crack.

Good heat conductivity is another property of the die material which is desirable for the purpose of carrying away the heat from the blank 25 when it is contacted by the dies so that it becomes rigid immediately after it is formed. Although a drastic temperature differential between the heated blank 25 and its cooperating dies is to be avoided because of the tendency for the blank to crack when contacted by surfaces of much lower temperatures, it is desirable to cool the blank rapidly to a temperature below that at which it becomes plastic in order to avoid oxidation of its surfaces. Thus, by employing copper dies or dies fabricated of a material having similar characteristics in respect to electrical and heat conductivity, a drastic temperature differential in the heated blank and the faces of the dies is avoided so that the cracking of the workpiece is prevented. However, the blank is rapidly brought down from the high temperature at which it is formed, to a lower temperature at which the material is no longer plastic but is in its rigid condition even though it is not cooled excessively. Under these ideal conditions, the blank 25 is accurately formed by dies while in its plastic condition, but it is maintained in this condition a very minimum amount of time so that a minimum oxidation of its surface occurs without the formation of any scale.

It is apparent that there is very little opportunity for the surfaces of the cutter blade 18 to oxidize when it is formed in accordance with the process of this invention, inasmuch as it is retained in its plastic condition at the maximum temperature for only a moment. As soon as the blank 25 is heated to the required temperature, the dies are actuated and at the same time the flow of induced electric current in the blank 25 may be terminated. When the blank 25 comes into contact with the cooler surfaces of the faces of the dies some of the heat from the blank is immediately transmitted from the blank 25 so that its temperature is lowered, but not to an extremely low temperature as would occur if it were quenched in a cold liquid medium. Instead the temperature is brought down rapidly to a point below that at which the blank is plastic where oxidation of its surface is not apt to occur by contact with the cooler faces of the dies, and then is cooler further from this temperature at a much slower rate.

From the foregoing description of an illustrative application of the teachings of the present invention, it will be apparent that there has been provided an improved method of forming cutter blades which is especially adapted for forming spiral sintered carbide cutter blades with improved accuracy without the formation of scale on the surfaces of the blades.

Although the illustrative embodiment of the invention herein set forth has been described in considerable detail to make a full disclosure of the invention, it is to be understood that the particular operation and structure described is intended to be illustrative only, and that the various features of the invention may be incorporated in other forms without departing from the spirit and scope of the invention as defined in the subjoined claims.

The principles of this invention having now been fully explained in connection with the foregoing description, we hereby claim as our invention:

1. The method of forming spiral cutter blades of uniform accuracy which comprises; placing a flat cutter blank between a pair of dies shaped to establish the camber of the blade; inducing a high frequency electric current into the blank in the dies to heat it sufficiently to render it plastic; actuating said pair of dies while the blank is in a plastic condition to form the camber of the blade in the blank; terminating the flow of induced current in the blank; removing the cooled blank from the dies; placing the cambered blank between a pair of dies shaped to form the spiral of the blade; inducing a high frequency electric current into the cambered blank in the dies to elevate its temperature sufficiently to render it plastic; actuating said spiral forming dies while the blank is in a plastic condition to form the spiral of the cutter blade; terminating the flow of induced current in the blade; and removing the cooled blade from said spiral forming dies; whereby a spiral cutter blade is accurately formed without producing scale on its surface.

2. The method of forming spiral carbide cutter blades of uniform accuracy from a flat blank which comprises; placing the blank of carbide to be formed between a pair of dies shaped to establish the camber of the blade; said dies being fabricated of a nonferrous material; inducing a high frequency electric current into the blank in the dies to elevate its temperature sufficiently to render it plastic; actuating said pair of dies while the blank is in a plastic condition to form the camber of the blade in the blank; terminating the flow of induced current in the blank; removing the cooled blank from said camber dies; placing the cambered blank between a pair of dies shaped to form the spiral of the blades, said spiral forming dies being fabricated of a nonferrous material; inducing a high frequency electric current into the cambered blank in the dies to elevate its temperature sufficiently to render it plastic; actuating said spiral forming dies while the blank is in a plastic condition to form the spiral of the cutter blade; terminating the flow of induced current in the blade; and removing the cooled blade from said spiral forming dies; whereby a spiral carbide cutter blade is accurately formed without causing the formation of scale on its surface.

3. The method of forming spiral carbide cutter blades of uniform accuracy from a flat blank which comprises; placing the blank of carbide to be formed between a pair of dies shaped to establish the camber of the blade, said dies being fabricated of copper; inducing a high frequency electric current into the blank in the dies to elevate its temperature sufficiently to render it plastic; actuating said pair of dies while the blank is in a plastic condition to form the camber of the blade in the blank; terminating the flow of induced current in the blank; removing the cooled blank from said camber dies; placing the cambered blank between a pair of dies shaped to form the spiral of the blades, said spiral forming dies being fabricated of copper; inducing a high frequency electric current into the cambered blank in the spiral dies to elevate its temperature sufficiently to render it plastic; actuating said spiral forming dies while the blank is in a plastic condition to form the spiral of the cutter blade; terminating the flow of induced current in the blade; and removing the cooled blade from said spiral forming dies; whereby a spiral carbide cutter blade is accurately formed without causing the formation of scale on its surface.

4. The method of forming spiral carbide cutter blades of uniform accuracy which comprises; placing the carbide blank to be formed between a pair of dies shaped to establish the camber of the blade; elevating the temperature of the blank between said dies to render it plastic; actuating said pair of camber dies while the blank is in a plastic condition to form the camber of the blade in the blank; placing the cambered blank between a pair of dies shaped to form the spiral of the blade; elevating the temperature of the cambered blank between said spiral dies to render it plastic; and actuating said spiral forming dies while the blank is in a plastic condition to form the spiral of the cutter blade; whereby a spiral carbide cutter blade is accurately formed without causing the formation of scale on its surface.

5. The method of forming spiral blades of uniform accuracy from a flat blank which comprises; placing the blank between the open faces of a pair of dies shaped to form the camber of the blade; elevating the temperature of the blank between said dies to render it plastic; actuating said pair of camber dies to close their faces against the blank while the blank is in a plastic condition to form the camber of the blade in the blank; accelerating the cooling of the cambered blank while it is engaged by the faces of the camber dies and cooling it sufficiently to render it rigid before removing it from the dies; placing the rigid cambered blank between the open faces of a pair of dies shaped to form the spiral curvature of the blade; elevating the temperature of the cambered blank between said spiral dies to render it plastic; actuating said spiral dies to close their faces against the blank while the blank is in a plastic condition to form the spiral curvature of the blade in the blank to complete the formation of the blade; and accelerating the cooling of the completed blade while it is engaged by the faces of the spiral dies and cooling it sufficiently to render it rigid before removing it from the dies; whereby a spiral blade is accurately formed without causing the formation of scale on its surface.

6. The method of forming spiral blades of uniform accuracy from a blank which comprises; placing the blank between the open faces of a pair of dies shaped to form the camber of the blade; elevating the temperature of the blank between said dies to render it plastic while maintaining the temperature of the faces of the dies below the temperature at which the blank becomes plastic; actuating said pair of camber dies to close their faces against the blank while the blank is in a plastic condition to form the camber of the blade in the blank and at the same time cool the cambered blank sufficiently to render it rigid by its contact with the cooler faces of the dies; placing the rigid cambered blank between the open faces of a pair of dies shaped to form the spiral curvature of the blade; elevating the temperature of the cambered blank between said spiral dies to render it plastic while maintaining the temperature of the faces of the spiral dies below the temperature at which the blank becomes plastic; and actuating said pair of spiral dies to close their faces against the cambered blank while the blank is in a plastic condition to form the spiral curvature of the blade in the blank to complete the formation of the blade and at the same time cool the blade sufficiently to render it rigid by its contact with the cooler faces of the dies; whereby a spiral blade is accurately formed without forming a scale on its surface.

7. The method of forming spiral blades of uniform accuracy from a blank which comprises; placing the blank between the open faces of a pair of dies shaped to form the camber of the blade; elevating the temperature of the blank between said dies sufficiently to render it plastic by a flow of electricity in the blank so that the temperature of the faces of the dies is maintained below the temperature at which the blank becomes plastic; actuating said pair of camber dies to close their faces against the blank while the blank is in a plastic condition to form the camber of the blade in the blank; interrupting the flow of electricity in said blank before it is removed from said camber dies so that it will be cooled sufficiently to render it rigid by contact with the cooler faces of the dies; placing the rigid cambered blank between the open faces of a pair of dies shaped to form the spiral curvature of the blade; elevating the temperature of the cambered blank between said spiral dies sufficiently to render it plastic by a flow of electricity in the blank so that the temperature of the faces of the spiral dies is maintained below the temperature at which the cambered blank becomes plastic; actuating said pair of spiral dies to close their faces against the cambered blank while the blank is in a plastic condition to form the spiral curvature of the blade in the blank and thereby complete the formation of the blade; and interrupting the flow of electricity in said blank before it is removed from the spiral dies so that it will be cooled sufficiently to render it rigid by contact with the cooler faces of the dies; whereby a spiral blade is accurately formed without forming a scale on its surface.

8. The method of forming carbide cutter blades of uniform accuracy from a blank which comprises; placing the blank between the open faces of a pair of dies shaped to form the curvature of the blade; elevating the temperature of the blank located between said dies sufficiently to render it plastic while maintaining the temperature of the faces of the dies below the temperature at which the blank becomes plastic; actuating said pair of dies to close their faces against the blank while the blank is in a plastic condition to form the curvature of the blade in the blank and at the same time cool the blade sufficiently to render it rigid by its contact with the cooler faces of the dies; and removing the rigid curved blade from the dies; whereby a curved blade is accurately formed without causing the formation of scale on its surface.

9. The method of forming spiral carbide cutter blades of uniform accuracy from a blank which comprises; placing the blank between the open faces of a pair of dies shaped to form the curvature of the blade; elevating the temperature of the blank between said dies sufficiently to render it plastic by inducing an electric current into the blank so that the temperature of the faces of the dies is maintained below the temperature at which the blank becomes plastic; actuating said pair of dies to close their faces against the blank while the blank is in a plastic condition to form the curvature of the blade in the blank; and interrupting the flow of induced current through said blank before it is removed from the dies so that it will be cooled sufficiently to render it rigid by contact with the cooler faces of the dies; whereby a spiral blade is accurately formed without causing the formation of scale on its surface.

10. The method of forming curved blades of uniform accuracy from a blank which comprises; placing the blank between the open faces of a pair of dies shaped to form the curvature of the blade; elevating the temperature of the blank between said dies sufficiently to render it plastic by initiating a flow of electrical current in the blank so that the temperature of the faces of the dies is maintained below the temperature at which the blank becomes plastic; actuating said dies to close their faces against the blank while the blank is in a plastic condition to form the curvature of the blade in the blank; and interrupting the flow of electric current in said blank before it is removed from the dies so that it will be cooled sufficiently to render it rigid by contact with the cooler faces of the dies; whereby a curved blade is accurately formed without causing the formation of scale on its surface.

References Cited in the file of this patent

UNITED STATES PATENTS

| | | |
|---|---|---|
| 340,024 | Williams | Apr. 13, 1886 |
| 1,251,578 | Riechen | Jan. 1, 1918 |
| 1,658,056 | Phelps et al. | Feb. 7, 1928 |
| 2,548,735 | Melette | Apr. 10, 1951 |
| 2,761,958 | Cook et al. | Sept. 4, 1956 |

OTHER REFERENCES

The disclosure on pages 24 through 26 of The Tool Engineer for October 1950.